US012603972B2

(12) United States Patent
    Alkhateeb et al.

(10) Patent No.: US 12,603,972 B2
(45) Date of Patent: Apr. 14, 2026

(54) WIRELESS TRANSMITTER IDENTIFICATION IN VISUAL SCENES

(71) Applicant: ARIZONA BOARD OF REGENTS ON BEHALF OF ARIZONA STATE UNIVERSITY, Scottsdale, AZ (US)

(72) Inventors: Ahmed Alkhateeb, Chandler, AZ (US); Muhammad Alrabeiah, Tempe, AZ (US); Gouranga Charan, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 437 days.

(21) Appl. No.: 17/863,567

(22) Filed: Jul. 13, 2022

(65) Prior Publication Data

US 2023/0031124 A1     Feb. 2, 2023

Related U.S. Application Data

(60) Provisional application No. 63/221,201, filed on Jul. 13, 2021.

(51) Int. Cl.
*H04N 7/00*       (2011.01)
*G06N 20/00*     (2019.01)
(Continued)

(52) U.S. Cl.
CPC ............. *H04N 7/181* (2013.01); *G06N 20/00* (2019.01); *G06V 10/7715* (2022.01); *H04W 64/003* (2013.01)

(58) Field of Classification Search
CPC ...... H04N 7/181; G06N 20/00; G06N 3/0499; G06N 3/09; G06V 10/7715; H04W 64/003
See application file for complete search history.

(56) References Cited

U.S. PATENT DOCUMENTS

2004/0196798 A1* 10/2004 Abousleman .......... H04B 7/185
                                                      370/316
2019/0044589 A1* 2/2019 Park ..................... H04B 7/0408
(Continued)

FOREIGN PATENT DOCUMENTS

CN      103491498 A * 1/2014 ............ H04W 4/029

OTHER PUBLICATIONS

Alahi, et al, RGB-W: When Vision Meets Wireless, ICCV (Year: 2015).*

(Continued)

*Primary Examiner* — Xiao Liu
(74) *Attorney, Agent, or Firm* — MH2 Technology Law Group LLP

(57) ABSTRACT

Wireless transmitter identification in visual scenes is provided. This technology enables important wireless communications and sensing applications such as (i) fast beam/blockage prediction in fifth generation (5G)/sixth generation (6G) systems using camera data, (ii) identifying cars and people in a surveillance camera feed using joint visual and wireless data processing, and (iii) enabling efficient autonomous vehicle communication relying on both the camera and wireless data. This is done by developing multimodal machine learning based frameworks that use the sensory data obtained by visual and wireless sensors. More specifically, given some visual data, an algorithm needs to perform the following: (i) predict whether an object responsible for a received radio signal is present or not, (ii) if it is present, detect which object it is out of the candidate transmitters, and (iii) predict what type of signal the detected object is transmitting.

20 Claims, 6 Drawing Sheets

(51) Int. Cl.
  *G06V 10/77* (2022.01)
  *H04N 7/18* (2006.01)
  *H04W 64/00* (2009.01)

(56) References Cited

U.S. PATENT DOCUMENTS

| | | | | |
|---|---|---|---|---|
| 2019/0174452 | A1* | 6/2019 | Lev | H04W 8/08 |
| 2019/0260455 | A1* | 8/2019 | Ryu | H04W 16/28 |
| 2020/0185835 | A1* | 6/2020 | Giusto | H01Q 21/30 |
| 2020/0275236 | A1* | 8/2020 | Gangakhedkar | G01S 19/252 |
| 2021/0367664 | A1* | 11/2021 | Akyildiz | H04B 7/1851 |
| 2022/0141685 | A1* | 5/2022 | Ergen | H04W 28/084 |
| | | | | 370/252 |
| 2022/0262164 | A1* | 8/2022 | Lin | G06Q 50/265 |

OTHER PUBLICATIONS

Tian et al, Applying Deep-Learning-Based Computer Vision to Wireless Communications: Methodologies, Opportunities, and Challenges, arXiv:2006.05782v4 (Year: 2020).*

Wei et al, AI-Enabled Cross-Modal Communications, IEEE Wireless Communications, vol. 28, No. 4, pp. 182-189 (Year: 2021).*

M. Alrabeiah, A. Hredzak, and A. Alkhateeb, "Millimeter wave base stations with cameras: Vision-aided beam and blockage prediction," in 2020 IEEE 91st Vehicular Technology Conference (VTC2020—Spring). IEEE, 2020, pp. 1-5.

C. Wen, W. Shih, and S. Jin, "Deep learning for massive MIMO CSI feedback," IEEE Wireless Communications Letters, vol. 7, No. 5, pp. 748-751, 2018.

M. Alrabeiah and A. Alkhateeb, "Deep learning for TDD and FDD massive MIMO: Mapping channels in space and frequency," in 2019 53rd Asilomar Conference on Signals, Systems, and Computers, 2019, pp. 1465-1470.

M. Alrabeiah and A. Alkhateeb, "Deep learning for mmWave beam and blockage prediction using sub-6 GHz channels," IEEE Transactions on Communications, vol. 68, No. 9, pp. 5504-5518, 2020.

A. Alkhateeb, S. Alex, P. Varkey, Y. Li, Q. Qu, and D. Tujkovic, "Deep learning coordinated beamforming for highly-mobile millimeter wave systems," IEEE Access, vol. 6, pp. 37328-37348, 2018.

T. Li, L. Fan, M. Zhao, Y. Liu, and D. Katabi, "Making the invisible visible: Action recognition through walls and occlusions," in Proceedings of the IEEE International Conference on Computer Vision, 2019, pp. 872-881.

A. Alahi, A. Haque, and L. Fei-Fei, "RGB-W: When vision meets wireless," in 2015 IEEE International Conference on Computer Vision (ICCV), 2015, pp. 3289-3297.

H. Zou, J. Yang, H. Prasanna Das, H. Liu, Y. Zhou, and C. J. Spanos, "WiFi and vision multimodal learning for accurate and robust device-free human activity recognition," in Proceedings of the IEEE Conference on Computer Vision and Pattern Recognition Workshops, 2019, 8 pages.

R. W. Heath, N. Gonzalez-Prelcic, S. Rangan, W. Roh, and A. M. Sayeed, "An overview of ' signal processing techniques for millimeter wave MIMO systems," IEEE Journal of Selected Topics in Signal Processing, vol. 10, No. 3, pp. 436-453, 2016.

T. S. Rappaport, Y. Xing, O. Kanhere, S. Ju, A. Madanayake, S. Mandal, A. Alkhateeb, and G. C. Trichopoulos, "Wireless communications and applications above 100 GHz: Opportunities and challenges for 6G and beyond," IEEE Access, vol. 7, pp. 78729-78757, 2019.

M. Alrabeiah, A. Hredzak, Z. Liu, and A. Alkhateeb, "ViWi: A deep learning dataset framework for vision-aided wireless communications," in 2020 IEEE 91st Vehicular Technology Conference (VTC2020—Spring). IEEE, 2020, pp. 1-5.

G. Charan, M. Alrabeiah, and A. Alkhateeb, "Vision-aided dynamic blockage prediction for 6g wireless communication networks," arXiv preprint arXiv:2006.09902, 2020, 6 pages.

D. Kang, Z. Ma, and A. B. Chan, "Beyond counting: comparisons of density maps for crowd analysis tasks-counting, detection, and tracking," IEEE Transactions on Circuits and Systems for Video Technology, vol. 29, No. 5, pp. 1408-1422, 2019.

* cited by examiner

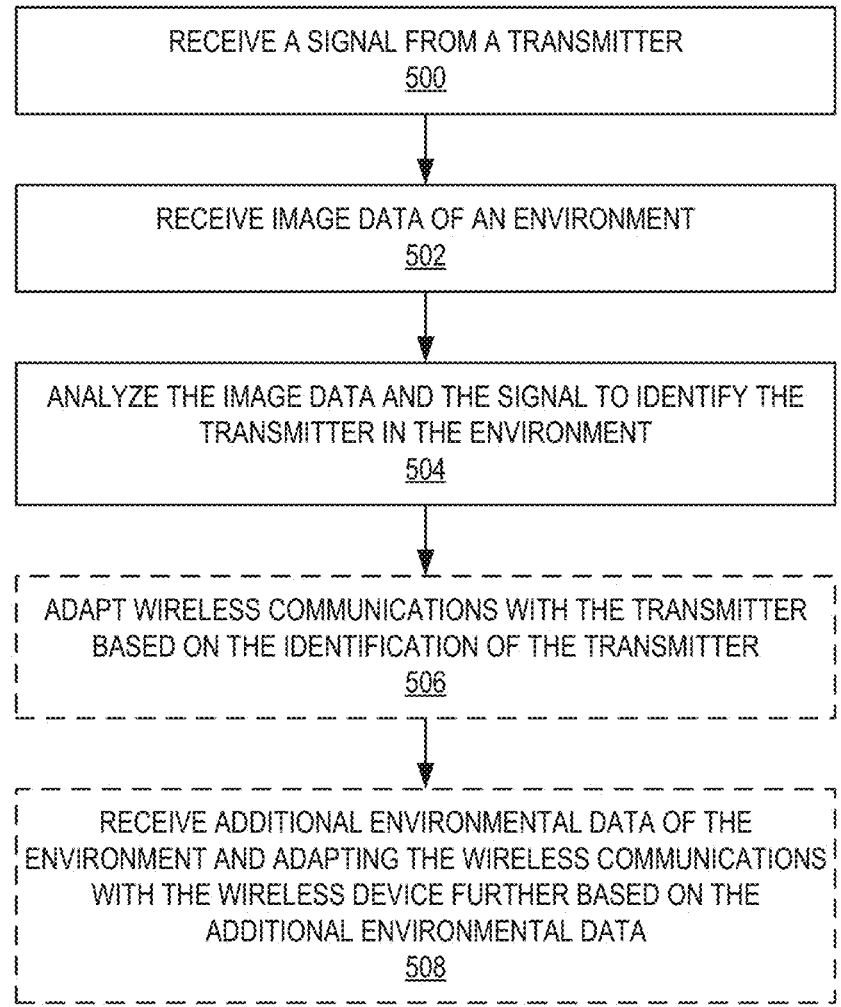

RECEIVE A SIGNAL FROM A TRANSMITTER
500

RECEIVE IMAGE DATA OF AN ENVIRONMENT
502

ANALYZE THE IMAGE DATA AND THE SIGNAL TO IDENTIFY THE
TRANSMITTER IN THE ENVIRONMENT
504

ADAPT WIRELESS COMMUNICATIONS WITH THE TRANSMITTER
BASED ON THE IDENTIFICATION OF THE TRANSMITTER
506

RECEIVE ADDITIONAL ENVIRONMENTAL DATA OF THE
ENVIRONMENT AND ADAPTING THE WIRELESS COMMUNICATIONS
WITH THE WIRELESS DEVICE FURTHER BASED ON THE
ADDITIONAL ENVIRONMENTAL DATA
508

*FIG. 5*

WIRELESS TRANSMITTER IDENTIFICATION IN VISUAL SCENES

CROSS-REFERENCE TO RELATED APPLICATION

This application claims the benefit of provisional patent application Ser. No. 63/221,201, filed on Jul. 13, 2021, entitled "Wireless Transmitter Identification in Visual Scenes," the disclosure of which is incorporated herein by reference in its entirety.

FIELD OF THE DISCLOSURE

The present disclosure is related to multimodal learning in wireless communications and sensing.

BACKGROUND

In recent years, machine learning has been a driving power for many technologies in wireless sensing and communications. The growing presence of machine learning in those fields could be attributed to a couple of reasons. First, machine learning brings adaptability to a system that implements it. For instance, a multiple-input multiple-output (MIMO) wireless communication system could learn to estimate the wireless channel using some form of a machine learning algorithm and avoid the large communication overhead associated with classical channel estimation.

The other reason for its growing presence is that machine learning enables the utilization of diverse data sources (or multimodal data sources) and collective experiences. In a system that implements a machine learning algorithm, the algorithm usually learns to perform its task by training on a dataset of sensory data samples (commonly referred to as the training dataset). Those samples could be obtained from a variety of sensors deployed by the system (e.g., RGB cameras, radio receivers, etc.), which affords the algorithm the exposure to multimodal data (e.g., RGB images, wireless channels, etc.). In addition, the data samples are commonly obtained at different stages of the system operation or from different environments where the system operates. This means those samples reflect the different states the system goes through, i.e., the different experiences the system undergoes. In all that body of work, a machine learning algorithm is trained on a uni— or bi—modal training dataset (i.e., a dataset with samples obtained from different sensors) to perform various tasks such as recognizing human actions behind a wall, position objects, and assisting the operation of a wireless communication system.

SUMMARY

Wireless transmitter identification in visual scenes is provided. This technology enables important wireless communications and sensing applications such as (i) fast beam/blockage prediction in fifth generation (5G)/sixth generation (6G) systems using camera data, (ii) identifying cars and people in a surveillance camera feed using joint visual and wireless data processing, and (iii) enabling efficient autonomous vehicle communication relying on both the camera and wireless data. This is done by developing multimodal machine learning based frameworks that use the sensory data obtained by visual and wireless sensors.

More specifically, given some visual data, an algorithm needs to perform the following: (i) predict whether an object responsible for a received radio signal is present or not, (ii)

if it is present, detect which object it is out of candidate transmitters, and (iii) predict what type of signal the detected object is transmitting. The objective of the technology is to aid the development and implementation of intelligent wireless communication and sensing systems that rely on both visual and wireless data in their operation.

An exemplary embodiment provides a method for providing vision-aided wireless communications, the method comprising: receiving a signal from a transmitter; receiving image data of an environment; and analyzing the image data and the signal to identify the transmitter in the environment.

Another exemplary embodiment provides a network node, comprising: communication circuitry configured to establish communications with a wireless device in an environment; and a processing system configured to: receive image data of the environment; perform an analysis of the environment based on the image data and communications with the wireless device; and adapt the communications with the wireless device in accordance with the analysis of the environment.

Another exemplary embodiment provides a neural network for wireless transmitter identification, the neural network comprising: a vision feature extractor; a wireless feature extractor; and a bounding box selection engine configured to provide transmitter identification from a cross-modal analysis of vision features from the vision feature extractor and wireless features from the wireless feature extractor.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 is a flow diagram illustrating a process for providing wireless transmitter identification.

DETAILED DESCRIPTION

Figure 1:
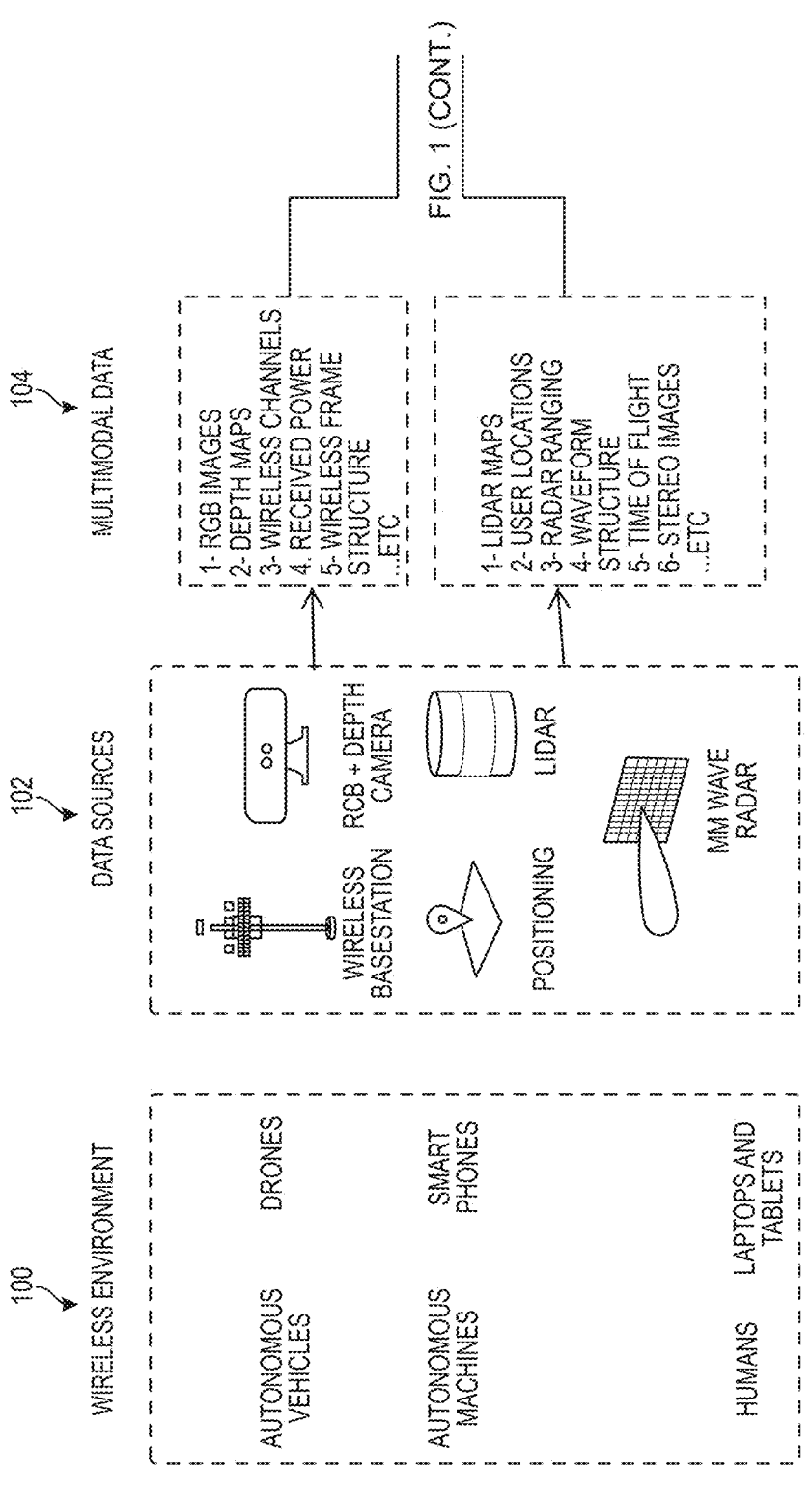
FIG. 1 is a schematic block diagram of an exemplary transmitter identification system implementing a multimodal learning approach according to embodiments described herein.
Figure 1:
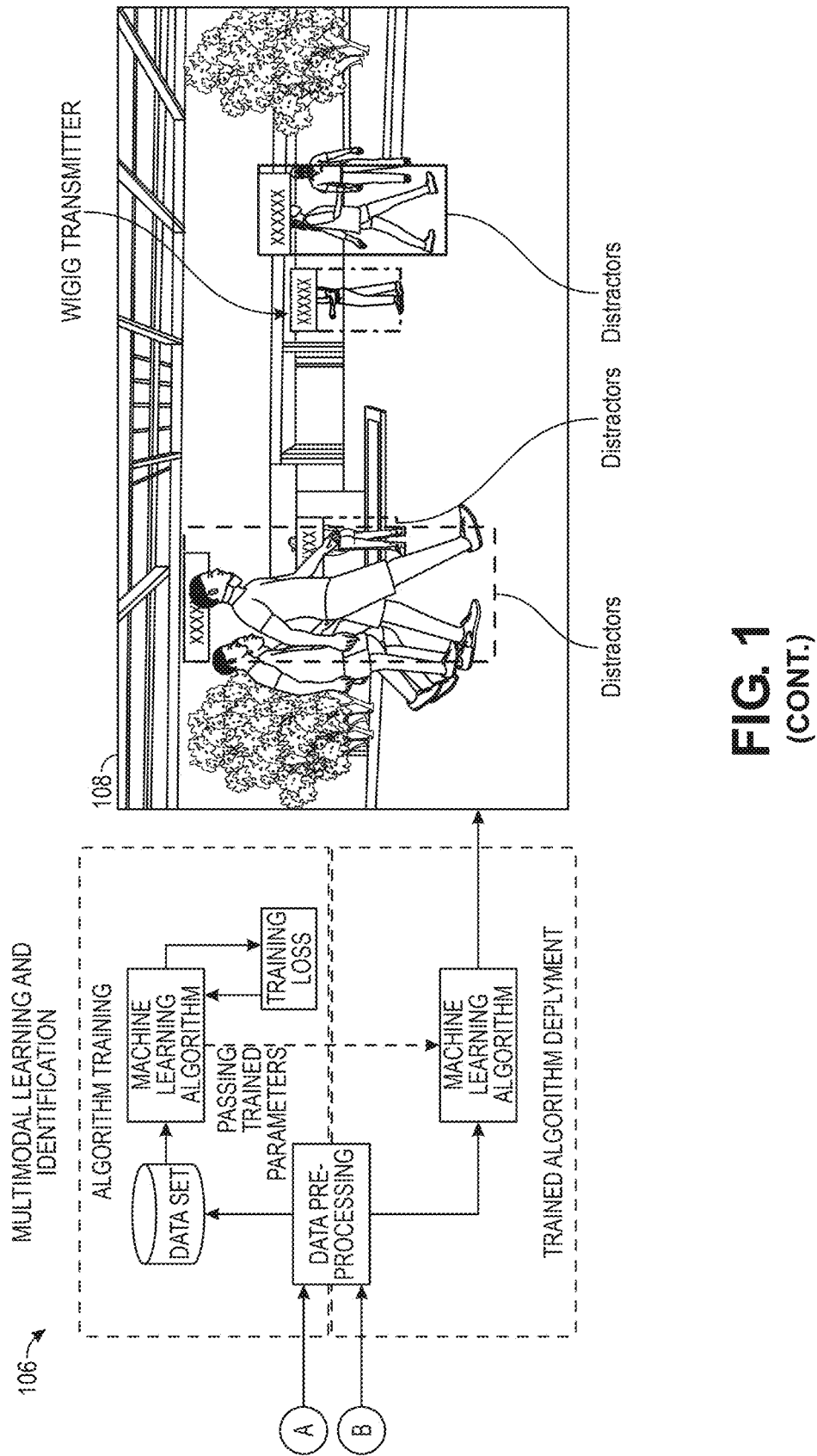

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Wireless transmitter identification in visual scenes is provided. This technology enables important wireless communications and sensing applications such as (i) fast beam/blockage prediction in fifth generation (5G)/sixth generation (6G) systems using camera data, (ii) identifying cars and people in a surveillance camera feed using joint visual and wireless data processing, and (iii) enabling efficient autonomous vehicle communication relying on both the camera and wireless data. This is done by developing multimodal machine learning based frameworks that use the sensory data obtained by visual and wireless sensors.

More specifically, given some visual data, an algorithm needs to perform the following: (i) predict whether an object responsible for a received radio signal is present or not, (ii) if it is present, detect which object it is out of candidate transmitters, and (iii) predict what type of signal the detected object is transmitting. The objective of the technology is to aid the development and implementation of intelligent wireless communication and sensing systems that rely on both visual and wireless data in their operation.

I. Introduction

This disclosure presents a new technology that targets enabling important wireless communications and sensing applications by leveraging various sensory data and multimodal machine learning. In the core of this technology, referred to as transmitter identification, multimodal machine learning and computer vision approaches are leveraged to enable the development of intelligent wireless communication and sensing systems and applications. The proposed technology is envisioned as a building block to multiple modern and future communication and sensing applications such as millimeter wave (mmWave) 5G/terahertz (THz) 6G communication, smart surveillance systems, autonomous vehicles, and electronic warfare.

More details of the proposed technology are provided in Section II. Then, Sections III and IV provide two example implementations of the technology based on different data sources and machine learning algorithms.

II. Wireless Transmitter Identification

Transmitter identification, in simple words, is a technology that is capable of detecting if a radio transmitter is present in a given visual scene, and if it is present then which object (in the visual scene) is the transmitter and what type of radio signal is being transmitted. These capabilities are enabled by a single or multiple machine learning algorithms trained on a pool of sensory data. The following subsection presents a description of a system implementing the technology and the role of multimodal learning. Based on that, a full definition is presented along with examples of how it could be utilized to enable important wireless communication, security, and sensing applications.

A. Transmitter Identification System

A wireless environment is commonly populated with multiple objects, dynamic and stationary, each of which could be a candidate radio transmitter. To perform a wireless communication or sensing task with the aid of computer vision and machine learning, a machine learning algorithm must have the ability to differentiate objects that appear in the observed visual data and transmit radio signals (referred to as transmitters) from those that appear and do not transmit (referred to as distractors). The algorithm must also be able to classify the type of radio signals emanating from objects declared as transmitters. Such a task is not feasible using RGB images or video sequences alone; they only reflect the visible part of the environment, which does not include any non-line-of-sight (NLOS) objects or physical phenomena beyond the realm of vision like electromagnetic waves.

Thus, a machine learning algorithm attempting to do transmitter identification may not have enough information to guide the classification process if it only relies on visual data.

FIG. 1 is a schematic block diagram of an exemplary transmitter identification system implementing a multimodal learning approach according to embodiments described herein. The proposed technology addresses the problem of differentiating transmitters from distractors and recognizing the type of signals each transmitter radiates, which is termed transmitter identification. The technology is designed to tackle this problem in multi-transmitter wireless settings by following a pipeline similar to that depicted in FIG. 1. The pipeline has four major components: (i) wireless environment 100, (ii) data sources 102, (iii) observed multimodal data 104, and (iv) multimodal learning and deployment. All four components are illustrated in FIG. 1.

As mentioned above, the wireless environment 100 has many objects with many signal types, e.g., some objects transmit WiFi signals, and others transmit Bluetooth signals. The objects include, but are not limited to, autonomous vehicles, drones, autonomous machines, smart phones, laptops, tablets, and humans. Those objects and their transmitted signals are capture by the second component of the pipeline, which is data sources 102. The data sources comprise sensors that include visual and wireless data sensors. Examples of these sensors include, but are not limited to, RGB cameras, mmWave radar, LiDAR sensors, and position sensors (positioning). The sensors together generate a pool of raw data making up the third component of the pipeline, the multimodal data 104. Example multimodal data 104 include, but are not limited to, RGB images, depth maps, wireless channels, received power, wireless frame structure, LIDAR maps, user locations, radar ranging, waveform structure, time of flight, stereo images, or combinations thereof. That data pool is expected to be a rich source of information about the wireless environment. It is passed down to the last component of the pipeline, multimodal learning and deployment. In its core is a machine learning algorithm and a data repository (dataset). This component is tasked with: (i) pre-processing and accumulating the multimodal data in the repository, and (ii) utilizing the pre-processed and stored data to train and deploy the machine learning algorithm that performs transmitter identification.

Learning to identify transmitters and their signal types in visual data is the main goal of the last component of the technology pipeline, multimodal learning and deployment. As the name suggests, this component achieves this goal by undergoing two sequential phases, namely learning and deployment, see the box labeled "multimodal learning and identification" 106 in FIG. 1. The learning phase has the algorithm trained to (i) detect all candidate objects that appear in the visual modality of the data, (ii) classify those objects into transmitters and distractors, and finally (iii) detect the signal type of each transmitter (see graphic 108). It is important to note here that the algorithm is also expected to detect and classify instances where the transmitters are not present in the visual modality but present in the other modalities. Once the algorithm is trained, it enters the deployment phase. This phase basically has the algorithm directly operating on the input processed data and producing predictions of the distractors, transmitters, and the types of detected signals. These predictions are considered the ultimate outcome of this technology, which is expected to be passed to other components of a wireless system to enable novel or classical operations.

B. Definition

With the system above in mind, the following provides a technical definition of the transmitter identification technology:

A technology that leverages various wireless and visual sensors and multimodal machine learning algorithms. The learning algorithms are presented with visual data along with other forms of sensory data, and are expected to identify the objects transmitting radio signals and the types of their signals in the visual data. More specifically, given some visual data, the algorithm needs to perform the following: (i) predict whether an object responsible for a received radio signal is present or not, (ii) if it is present, detect which object it is out of the candidate transmitters, and (iii) predict what type of signal the detected object is transmitting.

The above definition states that the task, in essence, is a three-component visual-detection task, in which the presence of the object of interest and the type of signal cannot be determined using visual data alone. The task requires the knowledge of additional modalities of data like wireless channels, user positions, depth maps, radar ranging maps, etc. This requirement specifies the first component that is the multimodality of the input data. The second component of the task is specified by the entity that utilizes that multimodal data, which is a machine learning algorithm. The algorithm should be able to learn from the data how to answer the following three questions: Is the transmitter present in the visual data? If yes, which object is it? And what type of signal is it transmitting? The answers to these three questions must serve the wireless system adopting the transmitter identification technology, and this is the third component of the task.

C. Applications

The proposed technology is envisioned as a building block to multiple modern and future applications, such as those that have clear dependence on line-of-sight (LOS) such as mmWave 5G and terahertz 6G systems. This will be explained further through the two different examples below.

1. Reliable 5G/6G Wireless Networks

Modern and future wireless communication networks are becoming increasingly reliant on high frequencies, more specifically mmWave 5G and sub-terahertz 6G. These frequencies provide large bandwidths to support the ever-growing demands for high data rates. However, behind their charms hides a critical challenge, which is the maintenance of LOS connections. This is a consequence of the poor ability of high-frequency singles to pass through objects. Their dependence on LOS basically renders any object in the environment a possible threat to the link connecting a transmitter and a receiver. It also draws a striking resemblance between wireless communications and computer vision, one that has led to the development of the vision-aided wireless communications (VAWC) framework.

LOS dependence is one of the issues that could be effectively handled with the aid of a vision system. More specifically, visual data with a machine learning algorithm could help the wireless network proactively predict which of the objects could block a LOS link between a transmitter and receiver. In practical wireless environments with multiple candidate transmitters, a machine learning algorithm needs to be able to differentiate transmitters from distractors in the input visual data, which is the very definition of transmitter identification. This is important as it enables the algorithm to assess the risk a distractor could possibly impose on a LOS link.

2. Privacy-Aware People Counting

An important task in computer vision and artificial intelligence is real-time crowd analysis, especially object counting in dense environments. It benefits a multitude of applications ranging from smart surveillance to marketing. However, counting is usually associated with privacy concerns; it is, to a large extent, based on visual data which may capture more information than needed to do the counting task. Wireless sensing could be an interesting alternative that preserves individuals' privacy. Many individuals carry radio transmitters everywhere they go, and the counting could be based on the number of transmitters there are.

Despite the elegance, this radio-based counting could be quite challenging to perform. This is a direct consequence of two facts: (i) the relation between the number of objects in an environment and the wireless channel is not easily characterized, and (ii) the number of radio transmitters cannot be guaranteed to match that of the individuals. Utilizing vision as side information, a machine learning algorithm could be trained to count objects based on radio signals. As a matter of fact, this could be done in a way that does not require continuous visual data feed, e.g., visual data could be used during training alone or it could be available in very low resolution. In any case, when both radio signals and visual data are available, a key component to the learning process is to create the association between a transmitter, its relevant object in the visual data, and the type of signal it transmits. Uncovering such association is the very task transmitter identification performs.

III. Transmitter Identification Using Vision-Wireless Data

This section presents the first example implementation of a transmitter identification solution. It relies on pairing vision-wireless data and deep neural networks (DNNs) to perform the identification task. The following three subsections detail the example.

A. Proposed Solution

The idea of this solution is to use wireless data (e.g., wireless channels, received power, beamforming vectors, etc.) to complement the missing information in the visual modality. Wireless data, in general, provides a sense of direction in the 3D space and is not restricted to LOS, i.e., it can provide some information about objects that are invisible to a visual system. These important properties are utilized in this example to guide the machine learning algorithm through the identification process.

The solution can be divided into two stages. The first stage has the visual and wireless modalities processed separately to extract modality-specific features. More to the point, the visual modality is processed using a deep learning algorithm to extract features characterizing all visible candidate objects, while the wireless modality is processed using a different deep learning algorithm to extract spatial features of the transmitters. Then, the second stage takes in the two features, learns a new set of cross-modality features, and uses those new features to: (i) predict whether there are transmitters in the environment or not, and (ii) predict which objects represent the transmitters if they are deemed present.

B. Machine Learning Model Architecture

Figure 2:
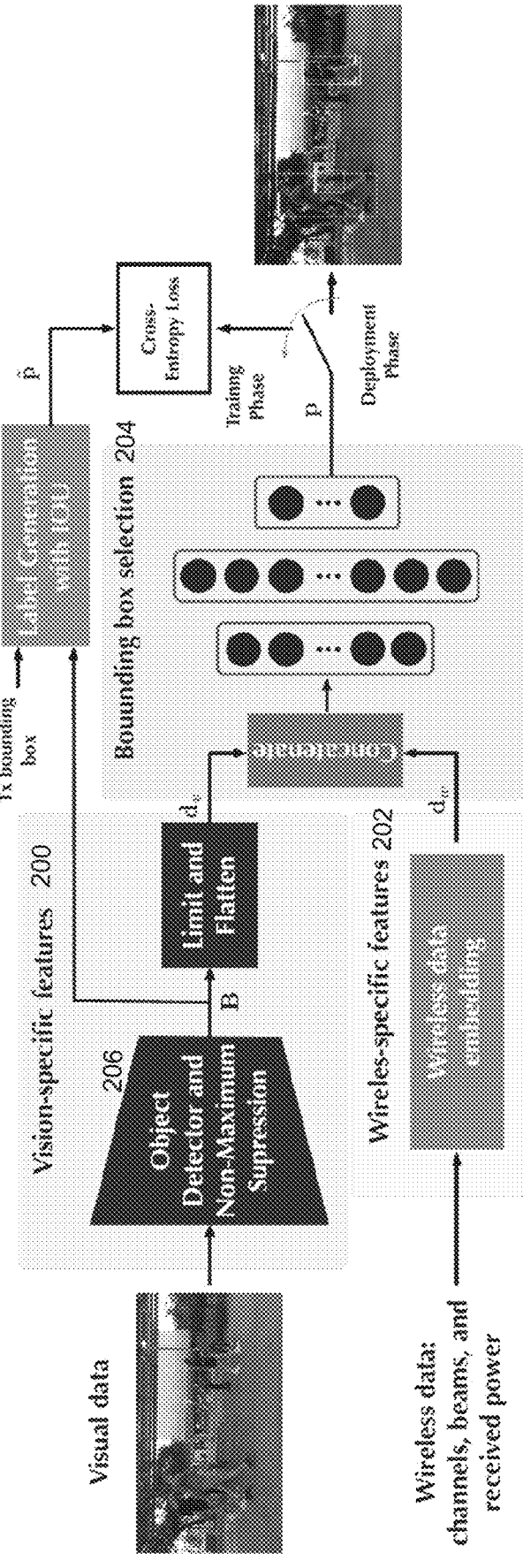
FIG. 2 is a schematic block diagram of a proposed deep neural network (DNN) architecture showing three components: (i) bounding-boxes extraction (vision-specific features), (ii) wireless data embedding (wireless-specific features), and (iii) transmitter bounding-box selection (cross-modality features and identification).

FIG. 2 is a schematic block diagram of a proposed DNN architecture showing the three components: (i) bounding-boxes extraction 200 (vision-specific features 200), (ii) wireless data embedding 202 (wireless-specific features 202), and (iii) transmitter bounding-box selection 204 (cross-modality features and identification). Using the developed idea above, a two-stage DNN architecture is proposed to learn the transmitter identification task. The architecture is composed of two sequential stages, the details of which are given below.

Modality-specific features: The role of this stage is to identify the candidate objects (i.e., objects that could be transmitters) and embed the wireless data. For the candidate objects, the architecture adopts a pre-trained object detector, and adjusts and fine-tunes its classifier layer to fit the number of candidate transmitter classes in the environment. Since object detectors commonly produce predictions with different confidence, the output of the detector is filtered using a non-maximum suppression (NMS) algorithm 206 to keep high confidence bounding boxes. These boxes are organized in a matrix $B \in \mathbb{R}^{N \times 4}$ where the number of rows N represents the maximum number of boxes an image is expected to have. For the wireless embedding 202, the wireless channels, beamforming vectors, and received power are all embedded into a feature vector, which the wireless-specific feature vector $d_w \in \mathbb{R}^{Q \times 1}$. This vector is expected to encode spatial information about the transmitters in the environment.

Bounding box selection 204: This stage is where both visual features and wireless features are merged and processed to extract the final transmitter bounding box. At the beginning of this stage, the wireless feature vector $d_w$ is stacked with the visual feature $d_v$, as shown in FIG. 2. The selection process in this stage is posed as a classification problem, in which the output produces a probability distribution $p \in \mathbb{R}^{(N+1) \times 1}$ over N+1 classes, representing the extracted boxes and the case of no transmitter. The selection network in this stage is designed using a multi-layer perceptron (MLP) as they are good universal function approximators.

C. Experimental Results

To evaluate the performance of the proposed architecture above, the architecture is trained on a dataset of RGB images and mmWave beams that are collected from various wireless environments. The architecture is then tested on a separate validation dataset that is composed of different RGB images and mmWave beams but collected from the same environments where the training data is collected.

Figure 3:
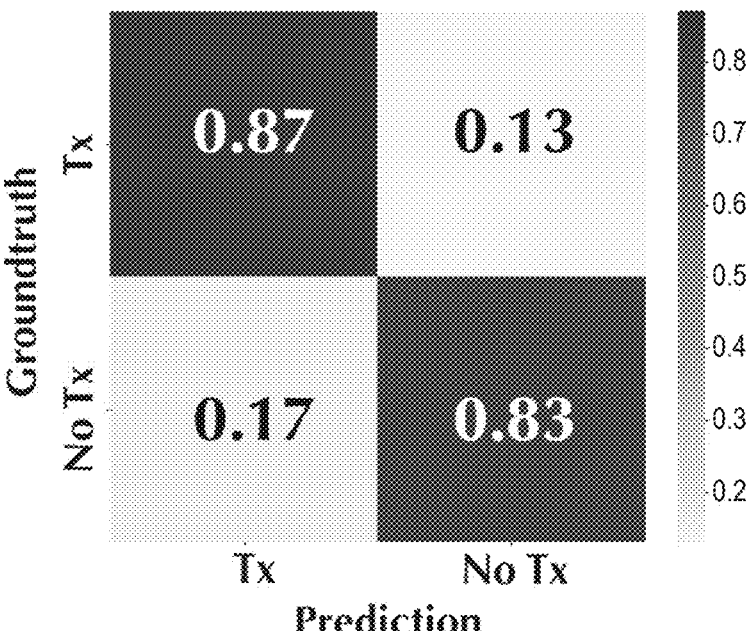
FIG. 3 is a graphical representation of a confusion matrix for a vision-wireless solution obtained from testing the model of FIG. 2 on a validation dataset.

FIG. 3 is a graphical representation of a confusion matrix for the vision-wireless solution obtained from testing the model of FIG. 2 on a validation dataset. Given that the number of positive cases (transmitter exists) in the validation set is 769 while the number of negative cases is 144, the accuracy of the proposed architecture is 86% and the precision is ~96% at a recall rate of 87%.

IV. Vision-Position Identification

This section describes the multi-user transmitter identification task utilizing visual and position data.

A. Proposed Solution mmWave communication systems require large antenna arrays and use directive narrow beams to achieve high received signal power gain. This is primarily to overcome the severe path-loss associated with the high-frequency signals. The best narrow beamforming vector is selected from the pre-defined codebook $\mathcal{F}$, which is associated with large training overhead. In general, the mechanism of directing the narrow beams can be viewed as focusing the large antenna arrays in a particular direction in space. In general, beam vectors divide the scene (spatial dimensions) into multiple sectors, where each sector is associated with a particular beam value.

The goal of the beam prediction system is to correctly identify the sector that a particular user belongs to. Therefore, it is possible to assign a particular beam value based on the user's location in the environment. Now, the location of a user can be derived from an image or from the position data. So instead of performing conventional beam training, the optimal beamforming vector can theoretically be obtained using the alternate visual or position data. This intuition leads to the reasoning behind selecting image and position data for the beam prediction task.

Similar to the vision-wireless transmitter identification, objects that resemble candidate transmitters could be discovered in the image utilizing the latest object detection models. Next, the position information of the user can be used to select the transmitter object and filter the distractors in the scene using a simple machine learning model.

B. Machine Learning Model Architecture

For the transmitter identification task, a two-staged DNN architecture is proposed. Similar to the vision-wireless architecture proposed above, the first stage of the architecture is bounding box detection. However, there is a slight variation to this step, which will be highlighted below. In the second stage, instead of using wireless information, this approach uses the position data to filter out the transmitter among several probable candidates in the scene. The details of the architecture are described below.

Bounding box detection: The overall approach remains similar to the bounding box detection step (e.g., 200, 202) proposed in vision-wireless transmitter identification of FIG. 2. In this architecture, the output bounding boxes are organized in a matrix $B \in \mathbb{R}^{N \times 2}$, i.e., only the center coordinates of the object are extracted and stored in the matrix. This is different from the vision-wireless approach, where the bounding box height and width are also stored along with the center coordinates. The extracted matrix B is further flattened to generate a high-dimensional vector $d_v \in \mathbb{R}^{2N \times 1}$.

Bounding box selection 204: In this stage, both the visual and the position data is utilized to identify the probable transmitter in the scene. The primary inputs to the network in this stage are: (i) the extracted bounding box vector $d_v$, and (ii) the ground-truth position values. Since the model is trained in a supervised fashion, the user's ground-truth center coordinates are also required. Generating the ground-truth center coordinates requires manual labeling of the dataset. The bounding box selection step could be further divided into a training and validation stage. In the training stage, the goal is to learn the relation between the ground-truth positions and the user's ground-truth center coordinates. Here, a polynomial regression model of degree 3 is trained to map the correlation between the ground-truth position and center coordinates. During the validation stage, the trained polynomial model is utilized to predict the center coordinate of the user based on the ground truth position value. The next step is to compute the Euclidean distance between the predicted center coordinates and the bounding box center coordinates of the N objects in $d_v$, returning a vector $D_{center} \in \mathbb{R}^{N \times 1}$. The object with the least distance from the predicted center coordinates is the transmitter in the scene.

C. Experimental Results

The proposed vision-position transmitter identification model's performance was validated on a multi-user vehicular dataset collected in a real-wireless environment. The dataset has a little over 1600 samples, which were further divided into training and validation set using a split of 80-20%. The validation set has 320 samples, with 161 samples where the transmitter is present and 159 samples where the transmitter is missing.

Figure 4:
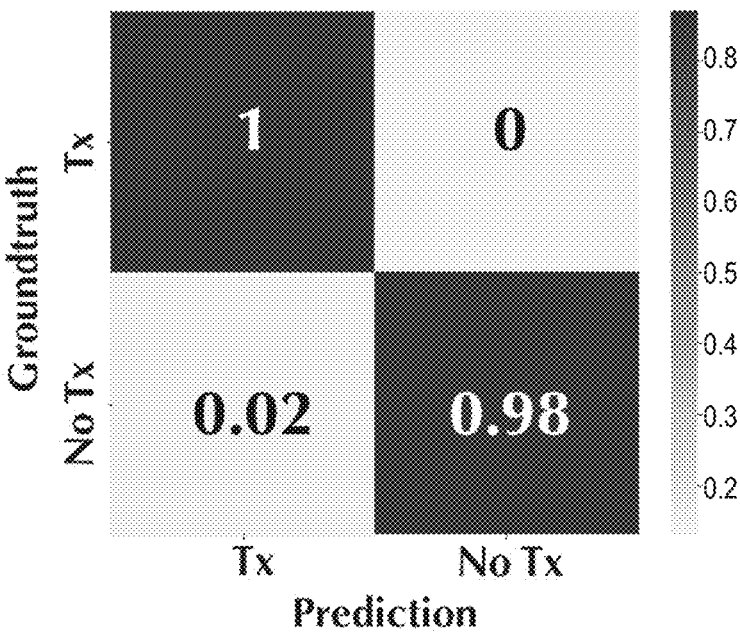
FIG. 4 is a graphical representation of a confusion matrix of a visual-position identification model on the validation dataset.

FIG. 4 is a graphical representation of a confusion matrix of the visual-position identification model on the validation dataset. The proposed transmitter identification model achieves an accuracy of ~98% for the cases where the transmitter is present and correctly identifies 100% of the data samples where the transmitter is missing in the scene. The proposed architecture's performance on the validation set reaffirms the efficacy of the multi-modal data for the multi-user transmitter identification task.

V. Wireless Transmitter Identification Process

FIG. 5 is a flow diagram illustrating a process for providing wireless transmitter identification. Dashed boxes represent optional steps. The process begins at operation 500, with receiving a signal from a transmitter. The process continues at operation 502, with receiving image data of an environment. The process continues at operation 504, with analyzing the image data and the signal to identify the transmitter in the environment. The process optionally continues at operation 506, with adapting wireless communications with the transmitter based on the identification of the transmitter. The process optionally continues at operation 508, with receiving additional environmental data of the environment and adapting the wireless communications with the wireless device further based on the additional environmental data.

Although the operations of FIG. 5 are illustrated in a series, this is for illustrative purposes and the operations are not necessarily order dependent. Some operations may be performed in a different order than that presented. Further, processes within the scope of this disclosure may include fewer or more steps than those illustrated in FIG. 5.

VI. Computer System Diagram

Figure 6:
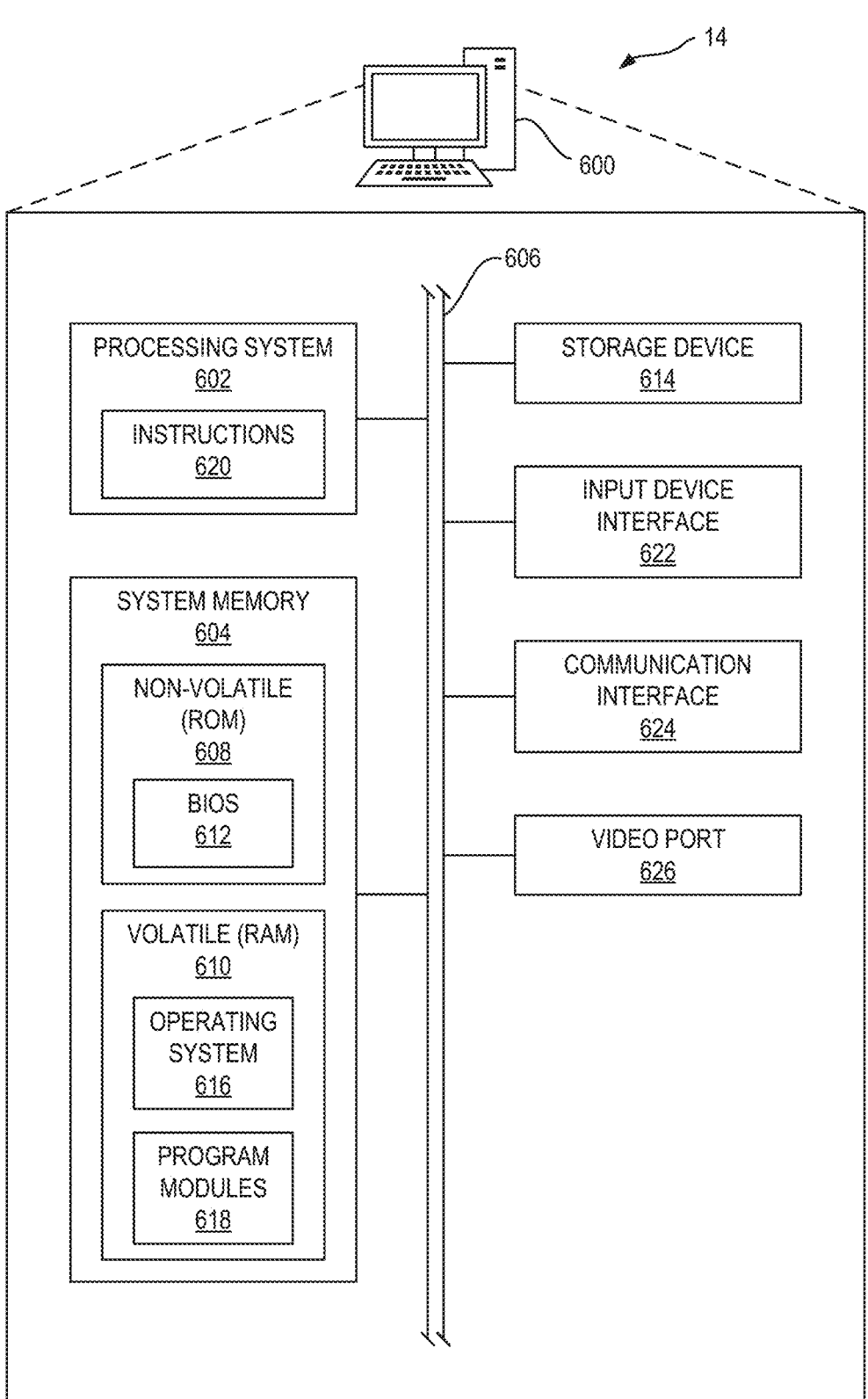
FIG. 6 is a block diagram of a network node suitable for implementing wireless transmitter identification according to embodiments disclosed herein.

FIG. 6 is a block diagram of a network node 14 suitable for implementing wireless transmitter identification according to embodiments disclosed herein. The network node 14 includes or is implemented as a computer system 600, which comprises any computing or electronic device capable of including firmware, hardware, and/or executing software instructions that could be used to perform any of the methods or functions described above. In this regard, the computer system 600 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 600 in this embodiment includes a processing system 602 (e.g., a processor or group of processors), a system memory 604, and a system bus 606. The system memory 604 may include non-volatile memory 608 and volatile memory 610. The non-volatile memory 608 may include read-only memory (ROM), erasable programmable read-only memory (EPROM), electrically erasable programmable read-only memory (EEPROM), and the like. The volatile memory 610 generally includes random-access memory (RAM) (e.g., dynamic random-access memory (DRAM), such as synchronous DRAM (SDRAM)). A basic input/output system (BIOS) 612 may be stored in the non-volatile memory 608 and can include the basic routines that help to transfer information between elements within the computer system 600.

The system bus 606 provides an interface for system components including, but not limited to, the system memory 604 and the processing system 602. The system bus 606 may be any of several types of bus structures that may further interconnect to a memory bus (with or without a memory controller), a peripheral bus, and/or a local bus using any of a variety of commercially available bus architectures.

The processing system 602 represents one or more commercially available or proprietary general-purpose processing devices, such as a microprocessor, central processing unit (CPU), or the like. More particularly, the processing system 602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing system 602 is configured to execute processing logic instructions for performing the operations and steps discussed herein.

In this regard, the various illustrative logical blocks, modules, and circuits described in connection with the embodiments disclosed herein may be implemented or performed with the processing system 602, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing system 602 may be a microprocessor, or may be any conventional processor, controller, microcontroller, or state machine. The processing system 602 may also be implemented as a combination of computing devices (e.g., a combination of a DSP and a microprocessor, a plurality of microprocessors, one or more microprocessors in conjunction with a DSP core, or any other such configuration). In some examples, the processing system 602 may be an artificially intelligent device and/or be part of an artificial intelligence system.

The computer system 600 may further include or be coupled to a non-transitory computer-readable storage medium, such as a storage device 614, which may represent an internal or external hard disk drive (HDD), flash memory, or the like. The storage device 614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 616 and any number of program modules 618 or other applications can be stored in the volatile memory 610, wherein the program modules 618 represent a wide array of computer-executable instructions corresponding to programs, applications, functions, and the like that may implement the functionality described herein in whole or in part, such as through instructions 620 on the processing device 602. The program modules 618 may also reside on the storage mechanism provided by the storage device 614. As such, all or a portion of the functionality described herein may be implemented as a computer program product stored on a transitory or non-transitory computer-usable or computer-readable storage medium, such as the storage device 614, volatile memory 608, non-volatile memory 610, instructions 620, and the like. The computer program product includes complex programming instructions, such as complex computer-readable program code, to cause the processing device 602 to carry out the steps necessary to implement the functions described herein.

An operator, such as the user, may also be able to enter one or more configuration commands to the computer system 600 through a keyboard, a pointing device such as a mouse, or a touch-sensitive surface, such as the display device, via an input device interface 622 or remotely through a web interface, terminal program, or the like via a communication interface 624. The communication interface 624 may be wired or wireless and facilitate communications with any number of devices via a communications network in a direct or indirect fashion. An output device, such as a display device, can be coupled to the system bus 606 and driven by a video port 626. Additional inputs and outputs to the computer system 600 may be provided through the system bus 606 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for providing wireless transmitter identification, the method comprising:

receiving a signal from a transmitter;

receiving image data of an environment;

extracting vision features from the image data;

extracting wireless features from the signal; and analyzing, using cross-modal analysis, the vision features and the wireless features to identify the transmitter in the environment and a type of the signal received from the transmitter, wherein the cross-modal analysis learns a new set of cross-modality features, and uses the new set of cross-modality features to predict whether there are transmitters in the environment, and predict which objects represent the transmitters.

2. The method of claim 1, further comprising adapting wireless communications with a wireless device associated with the transmitter based on the identification of the transmitter.

3. The method of claim 2, wherein adapting the wireless communications with the wireless device comprises adjusting an allocation of network resources based on the analyzed image data.

4. The method of claim 2, further comprising:

receiving additional environmental data of the environment; and adapting the wireless communications with the wireless device further based on the additional environmental data.

5. The method of claim 4, wherein the additional environmental data comprises at least one of global positioning system (GPS) data received from the wireless device, light detection and ranging (LIDAR) data received from a LIDAR device, radar data received from a radar system, or a wireless signal received at a transceiver.

6. The method of claim 1, further comprising locating the transmitter in the environment.

7. The method of claim 1, further comprising processing the image data to track a location of a wireless device associated with the transmitter in the environment.

8. The method of claim 7, further comprising adapting wireless communications with the wireless device by beam selecting one or more beamforming vectors for the wireless communications based on the tracked location of the wireless device in the environment.

9. The method of claim 1, wherein receiving the image data comprises receiving image data from a plurality of imaging devices distributed in the environment.

10. The method of claim 1, wherein extracting the vision features comprises:

detecting objects from the image data; and limiting overlapping bounding boxes for the detected objects.

11. The method of claim 1, wherein the wireless features comprise:

wireless data;

channels;

beams; and received power.

12. A network node, comprising:

communication circuitry configured to establish communications with a wireless device in an environment; and a processing system configured to:

receive image data of the environment;

receive a signal from the wireless device;

extract vision features from the image data;

extract wireless features from the signal;

perform an analysis, using cross-modal analysis, of the vision features and the wireless features to identify the wireless device and a type of the signal received from the transmitter; and adapt the communications with the wireless device in accordance with the analysis, wherein the cross-modal analysis learns a new set of cross-modality features, and uses the new set of cross-modality features to predict whether there are transmitters in the environment, and predict which objects represent the transmitters.

13. The network node of claim 12, wherein the communication circuitry comprises a multi-band radio transceiver.

14. The network node of claim 13, wherein the multi-band radio transceiver is configured to communicate via at least one sub-6 gigahertz (GHz) band and one millimeter wave (mmWave) band.

15. The network node of claim 13, wherein the multi-band radio transceiver is configured to communicate via at least one terahertz (THz) band.

16. The network node of claim 12, wherein the processing system is configured to perform the analysis of the environment using a machine learning framework.

17. The network node of claim 12, wherein the image data is received from the wireless device.

18. The network node of claim 12, further comprising a red-green-blue (RGB) camera configured to capture the image data.

19. The network node of claim 12, wherein the processing system is configured to:

detect objects from the image data; and limit overlapping bounding boxes for the detected objects.

20. A neural network for wireless transmitter identification, the neural network comprising:

a vision feature extractor;

a wireless feature extractor; and a bounding box selection engine configured to provide transmitter identification and identification of a type of the signal received from the transmitter from a cross-modal analysis of vision features from the vision feature extractor and wireless features from the wireless feature extractor, wherein the cross-modal analysis learns a new set of cross-modality features, and uses the new set of cross-modality features to predict whether there are transmitters in the environment, and predict which objects represent the transmitters.

* * * * *